United States Patent
Lende et al.

(10) Patent No.: US 9,512,345 B2
(45) Date of Patent: Dec. 6, 2016

(54) SETTABLE SPACER FLUIDS COMPRISING PUMICITE AND METHODS OF USING SUCH FLUIDS IN SUBTERRANEAN FORMATIONS

(71) Applicant: Halliburton Energy Services, Inc., Houston, TX (US)

(72) Inventors: Gunnar Lende, Sola (NO); Jeffery Dwane Karcher, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/630,507

(22) Filed: Sep. 28, 2012

(65) Prior Publication Data

US 2013/0180716 A1    Jul. 18, 2013

Related U.S. Application Data

(60) Continuation-in-part of application No. 12/613,788, filed on Nov. 6, 2009, now abandoned, which is a continuation-in-part of application No. 11/844,188, filed on Aug. 23, 2007, now abandoned, which is a division of application No. 10/969,570, filed on Oct. 20, 2004, now Pat. No. 7,293,609.

(51) Int. Cl.
| | |
|---|---|
| C09K 8/40 | (2006.01) |
| E21B 33/13 | (2006.01) |
| C09K 8/42 | (2006.01) |
| C09K 8/52 | (2006.01) |

(52) U.S. Cl.
CPC ............... *C09K 8/40* (2013.01); *C09K 8/424* (2013.01); *C09K 8/52* (2013.01); *E21B 33/13* (2013.01)

(58) Field of Classification Search
None
See application file for complete search history.

(56) References Cited

U.S. PATENT DOCUMENTS

| | | | |
|---|---|---|---|
| 2,848,051 A * | 8/1958 | Williams | C09K 8/42 166/291 |
| 2,987,411 A | 6/1961 | Minnick | 106/405 |
| 3,042,608 A | 7/1962 | Morris | 252/8.5 |
| 3,220,863 A | 11/1965 | Mayhew | 106/96 |
| 3,360,040 A | 12/1967 | Johnson | 165/181 |
| 3,557,876 A * | 1/1971 | Tragesser | 166/292 |
| 3,798,836 A | 3/1974 | Rubens et al. | 47/63 |
| 3,850,248 A | 11/1974 | Carney | 166/291 |
| 3,896,031 A | 7/1975 | Carney | 252/8.5 C |
| 4,108,779 A | 8/1978 | Carney | 252/8.5 P |
| 4,141,843 A | 2/1979 | Watson | 252/8.55 R |
| 4,217,229 A | 8/1980 | Watson | 252/8.55 R |
| 4,233,162 A | 11/1980 | Carney | 252/8.5 C |
| 4,276,182 A | 6/1981 | Beirute | 507/272 |
| 4,498,995 A | 2/1985 | Gockel | 507/100 |
| 4,515,216 A | 5/1985 | Childs | 166/293 |
| 4,530,402 A | 7/1985 | Smith et al. | 166/291 |
| 4,536,297 A | 8/1985 | Loftin et al. | 252/8.5 C |
| 4,588,032 A | 5/1986 | Weigand et al. | 166/291 |
| 4,717,488 A | 1/1988 | Seheult et al. | 252/8.551 |
| 5,309,999 A | 5/1994 | Cowan et al. | 166/293 |
| 5,361,842 A | 11/1994 | Hale et al. | 166/293 |
| 5,515,921 A | 5/1996 | Cowan et al. | 166/293 |
| 5,566,760 A | 10/1996 | Harris | 166/308 |
| 5,716,910 A | 2/1998 | Totten et al. | 507/102 |
| 5,789,352 A | 8/1998 | Carpenter et al. | 507/209 |
| 5,851,960 A | 12/1998 | Totten et al. | 507/118 |
| 5,866,517 A | 2/1999 | Carpenter et al. | 507/226 |
| 5,904,208 A | 5/1999 | Ray et al. | 166/312 |
| 5,990,052 A | 11/1999 | Harris | 507/217 |
| 5,996,692 A | 12/1999 | Chan et al. | 166/263 |
| 6,063,738 A | 5/2000 | Chatterji et al. | 507/269 |
| 6,283,213 B1 | 9/2001 | Chan | 166/291 |
| 6,367,550 B1 | 4/2002 | Chatterji et al. | 166/293 |
| 6,454,008 B1 | 9/2002 | Chatterji et al. | 166/308 |
| 6,489,270 B1 | 12/2002 | Vollmer et al. | 507/261 |
| 6,492,305 B2 | 12/2002 | Sifferman et al. | 507/212 |
| 6,566,310 B2 | 5/2003 | Chan | 507/211 |
| 6,619,399 B1 | 9/2003 | Chatterji et al. | 166/293 |
| 6,668,927 B1 | 12/2003 | Chatterji et al. | 166/291 |
| 6,689,208 B1 | 2/2004 | Brothers | 166/794 |
| 6,734,146 B2 | 5/2004 | Chatterji et al. | 507/202 |
| 6,739,806 B1 | 5/2004 | Szymanski et al. | 405/267 |
| 6,861,392 B2 | 3/2005 | Shaarpour | 507/104 |
| 6,881,708 B2 | 4/2005 | Reddy | 507/117 |
| 6,904,971 B2 | 6/2005 | Brothers et al. | 166/293 |
| 6,908,508 B2 | 6/2005 | Brothers | 106/794 |

(Continued)

FOREIGN PATENT DOCUMENTS

| | | | |
|---|---|---|---|
| CA | 2584272 | 4/2006 | ............... C09K 8/42 |
| EP | 430602 A1 | 6/1991 | ............. C10M 173/02 |

(Continued)

OTHER PUBLICATIONS

Halliburton brochure entitled "Alpha Spacer Cementing Spacer", 1999.
Baroid brochure entitled "DEXTRID® Filtration Control Agent", 2002.
Halliburton brochure entitled "Dual Spacer System", 1999.
Halliburton brochure entitled "Dual Spacer E System", 1999.
Halliburton brochure entitled "Dual Spacer Mixing Aid Additive", 1999.

(Continued)

*Primary Examiner* — Alicia Bland
(74) *Attorney, Agent, or Firm* — Craig W. Roddy; Baker Botts L.L.P.

(57) ABSTRACT

Methods and compositions for the treatment of subterranean formations, and more specifically, treatment fluids containing pumicite and methods of using these treatment fluids in subterranean formations, are provided. An example of a method is a method of displacing a fluid in a well bore. Another example of a method is a method of separating fluids in a well bore in a subterranean formation. An example of a composition is a settable spacer fluid comprising pumicite, an activating agent, and a base fluid.

8 Claims, No Drawings

(56) References Cited

U.S. PATENT DOCUMENTS

| | | | |
|---|---|---|---|
| 6,964,302 B2 | 11/2005 | Luke et al. | 166/295 |
| 6,989,057 B2 | 1/2006 | Getzlaf et al. | 106/813 |
| 7,021,380 B2 | 4/2006 | Caveny et al. | 166/293 |
| 7,048,053 B2 | 5/2006 | Santra et al. | 166/291 |
| 7,055,603 B2 | 6/2006 | Caveny | 166/294 |
| 7,066,285 B2 | 6/2006 | Shaarpour | 175/72 |
| 7,073,585 B2 | 7/2006 | Morgan et al. | 166/294 |
| 7,147,705 B2 | 12/2006 | Chatterji et al. | 106/696 |
| 7,150,321 B2 | 12/2006 | Luke et al. | 166/291 |
| 7,213,646 B2 | 5/2007 | Roddy et al. | 166/285 |
| 7,229,492 B2 | 6/2007 | Chatterji | 106/724 |
| 7,255,739 B2 | 8/2007 | Brothers et al. | 106/694 |
| 7,293,609 B2 | 11/2007 | Dealy | 166/285 |
| 7,350,575 B1 | 4/2008 | Lewis et al. | 166/293 |
| 7,431,086 B2 | 10/2008 | Lewis et al. | 166/293 |
| 7,544,640 B2 | 6/2009 | Luke et al. | 166/292 |
| 7,547,663 B2 | 6/2009 | Kirsner | 507/103 |
| 7,576,042 B2 | 8/2009 | Lewis et al. | 507/221 |
| 7,631,541 B2 | 12/2009 | Waugh et al. | 73/32 R |
| 7,654,326 B1 | 2/2010 | Santra et al. | 166/292 |
| 7,867,954 B2* | 1/2011 | Warrender et al. | 507/269 |
| 2002/0193257 A1 | 12/2002 | Lee et al. | |
| 2004/0107877 A1 | 6/2004 | Getzlaf et al. | |
| 2004/0108113 A1 | 6/2004 | Luke et al. | |
| 2004/0112600 A1 | 6/2004 | Luke et al. | |
| 2004/0171499 A1 | 9/2004 | Ravi et al. | |
| 2004/0188091 A1 | 9/2004 | Luke et al. | |
| 2004/0188092 A1 | 9/2004 | Santra et al. | |
| 2004/0244650 A1* | 12/2004 | Brothers | C04B 28/10 106/681 |
| 2005/0034864 A1 | 2/2005 | Caveny et al. | |
| 2006/0081372 A1 | 4/2006 | Dealy et al. | |
| 2006/0174802 A1 | 8/2006 | Bedel | |
| 2006/0258541 A1 | 11/2006 | Crews | |
| 2007/0012445 A1 | 1/2007 | Nguyen et al. | |
| 2007/0022917 A1 | 2/2007 | Chatterji et al. | |
| 2007/0056732 A1 | 3/2007 | Roddy et al. | |
| 2007/0114022 A1 | 5/2007 | Nguyen | |
| 2007/0203028 A1 | 8/2007 | Lewis et al. | |
| 2007/0215355 A1 | 9/2007 | Shapovalov et al. | |
| 2007/0221379 A1 | 9/2007 | Brothers et al. | |
| 2008/0060811 A1 | 3/2008 | Bour et al. | |
| 2008/0060820 A1 | 3/2008 | Bour et al. | |
| 2008/0105167 A1 | 5/2008 | Santra et al. | |
| 2008/0119374 A1 | 5/2008 | Willberg et al. | |
| 2008/0169100 A1 | 7/2008 | Lewis et al. | |
| 2008/0171673 A1 | 7/2008 | Lewis et al. | |
| 2008/0171674 A1 | 7/2008 | Lewis et al. | |
| 2008/0274918 A1 | 11/2008 | Quintero et al. | |
| 2009/0236097 A1 | 9/2009 | Roddy et al. | |
| 2010/0006288 A1 | 1/2010 | Santra et al. | |
| 2010/0044043 A1 | 2/2010 | Roddy et al. | |
| 2010/0044057 A1* | 2/2010 | Dealy | C09K 8/40 166/381 |
| 2010/0056405 A1 | 3/2010 | Ali et al. | |
| 2010/0258312 A1 | 10/2010 | Brenneis et al. | |
| 2011/0005773 A1 | 1/2011 | Dusterhoft et al. | |
| 2011/0028594 A1 | 2/2011 | Roddy et al. | |
| 2011/0100626 A1 | 5/2011 | Brenneis et al. | |
| 2012/0227631 A1 | 9/2012 | Roddy et al. | |

FOREIGN PATENT DOCUMENTS

| | | | | |
|---|---|---|---|---|
| WO | 2005/068582 A2 | 7/2005 | | C04B 28/18 |
| WO | 2006/043022 | 4/2006 | | C09K 8/42 |

OTHER PUBLICATIONS

Halliburton brochure entitled "Hi-Dense® Weight Additives", 1998.
Halliburton brochure entitled "HR®-5 Cement Additive", 1998.
Halliburton brochure entitled "Tuned Spacer™ II Material Optimized Rheology Spacer", 2004.
Halliburton brochure entitled "WAC-9 Fluid-Loss Additive", 1999.
Paper entitled "Spacers and Their Applications in Primary Cementing" by Crook, et al., 1982.
Office Action issued in U.S. Appl. No. 10/969,570, Sep. 29, 2006.
Final Office Action issued in U.S. Appl. No. 10/969,570, Mar. 2, 2007.
Notice of Allowance issued in U.S. Appl. No. 10/969,570, May 23, 2007.
Office Action issued in U.S. Appl. No. 12/613,788, Sep. 28, 2012.
Office Action issued in U.S. Appl. No. 12/613,788, May 14, 2012.
Office Action issued in U.S. Appl. No. 12/613,788, Feb. 23, 2012.
Office Action issued in U.S. Appl. No. 12/613,788, Oct. 12, 2011.
Foreign communication from a related counterpart application PCT/GB2005/003714, Mar. 2, 2006.
International Search Report for related application PCT/GB2005/003714, Apr. 27, 2006.
International Preliminary Report on Patentability for related application PCT/GB2005/003714, Apr. 24, 2007.
Foreign communication from a related counterpart application PCT/GB2005/003714 (EPO05786946), Aug. 10, 2008.
Communication from European Patent Office for related application PCT/GB2005/003714, Jul. 28, 2009.
Office Action issued in U.S. Appl. No. 11/844,138, Jun. 9, 2010.
Notice of Allowance issued in U.S. Appl. No. 11/844,138, Oct. 7, 2010.
Assistant Technology Editor Karen Bybee, "Trapped-Annular-Pressure Mitigation: Spacer Fluid that Shrinks—Update," Journal of Petroleum Technology, pp. 85-86, May 2009.
Office Action issued in U.S. Appl. No. 12/836,309, Oct. 6, 2011.
Office Action issued in U.S. Appl. No. 12/836,309, Mar. 6, 2012.
Final Office Action issued in U.S. Appl. No. 12/836,309, Jun. 29, 2012.
Advisory Action issued in U.S. Appl. No. 12/836,309, Sep. 6, 2012.
International Search Report and Written Opinion for PCT/GB2011/001058, Sep. 21, 2011.
Office Action issued in U.S. Appl. No. 13/596,905, Nov. 2, 2012.
Office Action issued in related Canadian Application 2,884,888, mailed Apr. 21, 2016 (6 pages).

* cited by examiner

SETTABLE SPACER FLUIDS COMPRISING PUMICITE AND METHODS OF USING SUCH FLUIDS IN SUBTERRANEAN FORMATIONS

CROSS-REFERENCE TO RELATED APPLICATIONS

This application is a continuation-in-part of U.S. patent application Ser. No. 12/613,788, entitled "Improved Treatment Fluids Comprising Pumicite and Methods of Using Such Fluids in Subterranean Formations," filed Nov. 6, 2009, which is a continuation-in-part of U.S. patent application Ser. No. 11/844,188, entitled "Treatment Fluids Comprising Vitrified Shale and Methods of Using Such Fluids in Subterranean Formations," filed Aug. 23, 2007, which is a divisional application of U.S. Pat. No. 7,293,609, entitled "Treatment Fluids Comprising Vitrified Shale and Methods of Using Such Fluids in Subterranean Formations," filed Oct. 20, 2004, the entireties of which are herein incorporated by reference.

BACKGROUND

The present invention relates to subterranean treatment operations, and more particularly, to improved treatment fluids comprising pumicite, and methods of using these improved treatment fluids in subterranean formations.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, gravel pack fluids, acidizing fluids, fracturing fluids, spacer fluids, and the like.

Spacer fluids often are used in oil and gas wells to facilitate improved displacement efficiency when displacing multiple fluids into a well bore. For example, spacer fluids often may be placed within a subterranean formation so as to physically separate incompatible fluids. Spacer fluids also may be placed between different drilling fluids during drilling-fluid changeouts, or between a drilling fluid and a completion brine.

Spacer fluids also may be used in primary or remedial cementing operations to separate, inter alia, a drilling fluid from a cement composition that may be placed in an annulus between a casing string and the subterranean formation, or in the wellbore or inside a casing string, whether the cement composition is placed in the annulus in either the conventional or reverse-circulation direction. The cement composition often is intended, inter alia, to set in the annulus, supporting and positioning the casing string, and bonding to both the casing string and the formation to form a substantially impermeable barrier, or cement sheath, which facilitates zonal isolation. The cement composition may also set inside the casing or inside the wellbore. If the spacer fluid does not adequately displace the drilling fluid from the annulus, or the cement slurry does not adequately displace the spacer from the annulus, the cement composition may fail to bond to the casing string and/or the formation to the desired extent, or pockets of drilling fluid and/or spacer fluid may be left which could compromise the hydraulic isolation. In certain circumstances, spacer fluids also may be placed in subterranean formations to ensure that all down hole surfaces are water-wetted before the subsequent placement of a cement composition, which may enhance the bonding that occurs between the cement composition and the water-wetted surfaces.

Conventional treatment fluids, including spacer fluids, often comprise materials that are costly and that, in certain circumstances, may become unstable at elevated temperatures. This is problematic, inter alia, because it may increase the cost of subterranean operations involving the treatment fluid.

Treatment fluids comprising vitrified shale may contain crystalline silica. For example, vitrified shale may contain about 16% crystalline silica and amorphous silica Crystalline silica is an inhalation hazard and can lead to health problems, such as silicosis, with extended exposure.

SUMMARY OF THE INVENTION

The present invention relates to subterranean treatment operations, and more particularly, to improved treatment fluids comprising pumicite, and methods of using these improved treatment fluids in subterranean formations.

In one embodiment, the present disclosure provides a settable spacer fluid comprising pumicite, an activating agent, and a base fluid.

In another embodiment, the present disclosure provides a method of using a settable fluid in a well bore, comprising: providing a well bore having a first fluid disposed therein; placing a second fluid into the well bore to displace at least a portion of the first fluid therefrom, wherein the second fluid comprises pumicite, an activating agent, and a base fluid; and allowing the second fluid to a least partially set in the well bore.

In another embodiment, the present disclosure provides a method of displacing a fluid in a well bore, comprising: providing a well bore having a first fluid disposed therein; placing a second fluid into the well bore to displace at least a portion of the first fluid therefrom, wherein the second fluid comprises pumicite, an activating agent, and a base fluid; placing a cement composition into the well bore to displace at least a first portion of the second fluid therefrom, wherein at least a second portion of the first fluid remains therein; allowing the cement composition to at least partially set in the well bore; and allowing the second portion of second fluid to at least partially set in the well bore.

The features and advantages of the present invention will be readily apparent to those skilled in the art upon a reading of the description of the preferred embodiments that follows.

DETAILED DESCRIPTION

The present invention relates to subterranean treatment operations, and more particularly, to improved treatment fluids comprising pumicite, and methods of using these improved treatment fluids in subterranean formations. The treatment fluids of the present invention are suitable for use in a variety of subterranean treatment applications, including well drilling, cementing, completion, and stimulation operations.

The treatment fluids of the present invention generally comprise pumicite and a base fluid. Optionally, the treatment fluids of the present invention may comprise additional additives as may be required or beneficial for a particular use. For example, the treatment fluids of the present invention may include other additives such as viscosifying agents, organic polymers, dispersants, surfactants, weighting agents, vitrified shale, and any combinations thereof.

The pumicite utilized in the treatment fluids of the present invention generally comprises any volcanic or similar material full of cavities and very light in weight. The term "pumicite" as used herein refers to a volcanic rock such as solidified frothy lava. In some embodiments of the present invention, the pumicite may be an amorphous aluminum silicate, containing less crystalline silica than vitrified shale. In certain embodiments, the pumicite may contain less than 1% crystalline silica. In certain embodiments of the present invention, the pumicite is sized to pass through a 200 mesh screen (DS-200). The pumicite may be cheaper and/or safer than vitrified shale, and may be useful in environmentally sensitive regions.

In certain embodiments of the present invention, pumicite is present in the treatment fluids of the present invention in an amount in the range of from about 0.01% to about 90% by weight of the treatment fluid. In other embodiments of the present invention, the pumicite is present in the treatment fluids of the present invention in an amount in the range of from about 1% to about 20% by weight of the treatment fluid. In other embodiments of the present invention, the pumicite is present in the treatment fluids of the present invention in an amount in the range of from about 10% to about 40% by weight of the treatment fluid. One skilled in the art, with the benefit of this disclosure, will recognize a suitable amount of pumicite for a particular application.

The base fluid utilized in the treatment fluids of the present invention may comprise an aqueous-based fluid, an oil-based fluid, a synthetic fluid, or an emulsion. In certain embodiments of the present invention, the base fluid may be an aqueous-based fluid that comprises fresh water, salt water, brine, sea water, or a mixture thereof. In certain embodiments of the present invention, the base fluid may be an aqueous-based fluid that may comprise cesium and/or potassium formate. The base fluid can be from any source provided that it does not contain compounds that may adversely affect other components in the treatment fluid. The base fluid may be from a natural or synthetic source. In certain embodiments of the present invention, the base fluid may comprise a synthetic fluid such as, but not limited to, esters, ethers, and olefins. Generally, the base fluid will be present in the treatment fluids of the present invention in an amount sufficient to form a pumpable slurry. In certain embodiments, the base fluid will be present in the treatment fluids of the present invention in an amount in the range of from about 15% to about 95% by weight of the treatment fluid. In other embodiments, the base fluid will be present in the treatment fluids of the present invention in an amount in the range of from about 25% to about 85% by weight of the treatment fluid. One of ordinary skill in the art, with the benefit of this disclosure, will recognize the appropriate amount of base fluid to use for a chosen application.

Optionally, the treatment fluids of the present invention further may comprise a viscosifying agent. The viscosifying agent may be any component suitable for providing a desired degree of solids suspension. The choice of a viscosifying agent depends upon factors such as the desired viscosity and the desired chemical compatibility with other fluids (e.g., drilling fluids, cement compositions, and the like). In certain embodiments of the present invention, the viscosifying agent may be easily flocculated and filtered out of the treatment fluids of the present invention. Suitable viscosifying agents may include, but are not limited to, colloidal agents (e.g., clays, polymers, guar gum), emulsion forming agents, diatomaceous earth, starches, biopolymers, synthetic polymers, or mixtures thereof. Suitable viscosifying agents often are hydratable polymers that have one or more functional groups. These functional groups include, but are not limited to, hydroxyl groups, carboxyl groups, carboxylic acids, derivatives of carboxylic acids, sulfate groups, sulfonate groups, phosphate groups, phosphonate groups, and amino groups. In certain embodiments of the present invention, viscosifying agents may be used that comprise hydroxyl groups and/or amino groups. In certain embodiments of the present invention, the viscosifying agents may be biopolymers, and derivatives thereof, that have one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethyl hydroxypropyl guar, and cellulose derivatives, such as hydroxyethyl cellulose, welan gums, and xanthan gums. Additionally, synthetic polymers that contain the above-mentioned functional groups may be used. Examples of such synthetic polymers include, but are not limited to, poly(acrylate), poly(methacrylate), poly(ethylene imine), poly(acrylamide), poly(vinyl alcohol), and poly(vinylpyrrolidone). Other suitable viscosifying agents include chitosans, starches and gelatins. Suitable clays include kaolinites, montmorillonite, bentonite, hydrous micas, attapulgite, sepiolite, and the like, as well as synthetic clays, such as laponite. An example of a suitable viscosifying agent is a hydroxyethyl cellulose that is commercially available under the trade name "WG-17" from Halliburton Energy Services, Inc., of Duncan, Okla. Another example of a suitable viscosifying agent is a welan gum that is commercially available under the trade name "BIOZAN" from Kelco Oilfield Services, Inc. Where included, the viscosifying agent may be present in the treatment fluids of the present invention in an amount sufficient to provide a desired degree of solids suspension. In certain embodiments, the viscosifying agent may be present in an amount in the range from about 0.01% to about 35% by weight of the treatment fluid. In other embodiments, the viscosifying agent may be present in an amount in the range from about 0.5% to about 2% by weight of the treatment fluid. In certain embodiments of the present invention wherein the treatment fluids will be exposed to elevated pH conditions (e.g., when the treatment fluids will be contacted with cement compositions), viscosifying agents such as welan gum, cellulose (and cellulose derivatives), and xanthan gum may be particularly suitable. One of ordinary skill in the art, with the benefit of this disclosure, will be able to identify a suitable viscosifying agent, as well as the appropriate amount to include, for a particular application.

Optionally, the treatment fluids of the present invention further may comprise a fluid loss control additive. Any fluid loss control additive suitable for use in a subterranean application may be suitable for use in the compositions and methods of the present invention. In certain embodiments, the fluid loss control additive may comprise organic polymers, starches, or fine silica. An example of a fine silica that may be suitable is commercially available from Halliburton Energy Services, Inc. under the trade name "WAC-9." An example of a starch that may be suitable is commercially available from Halliburton Energy Services, Inc. under the trade name "DEXTRID." In certain embodiments where the treatment fluids of the present invention comprise a fluid loss control additive, the fluid loss control additive may be present in the treatment fluids of the present invention in an amount in the range from about 0.01% to about 6% by weight of the treatment fluid. In other embodiments, the fluid loss control additive may be present in the treatment fluids of the present invention in an amount in the range from about 0.05% to about 1% by weight of the treatment fluid. One skilled in the art, with the benefit of this disclosure, will recognize the appropriate amount of a fluid loss control additive to use for a particular application.

Optionally, the treatment fluids of the present invention may comprise a dispersant. Suitable examples of dispersants include, but are not limited to, sulfonated styrene maleic anhydride copolymer, sulfonated vinyl toluene maleic anhydride copolymer, sodium naphthalene sulfonate condensed with formaldehyde, sulfonated acetone condensed with formaldehyde, lignosulfonates (e.g., modified sodium lignosulfonate), allyloxybenzene sulfonate, allyl sulfonate and non-ionic monomers, and interpolymers of acrylic acid. An example of a dispersant that may be suitable is commercially available from National Starch & Chemical Company of Newark, N.J. under the trade name "Alcosperse 602 ND," and is a mixture of 6 parts sulfonated styrene maleic anhydride copolymer to 3.75 parts interpolymer of acrylic acid. Another example of a dispersant that may be suitable is a modified sodium lignosulfonate that is commercially available from Halliburton Energy Services, Inc., of Duncan, Okla., under the trade name "HR®-5." Where included, the dispersant may be present in an amount in the range from about 0.0001% to about 4% by weight of the treatment fluid. In other embodiments, the dispersant may be present in an amount in the range from about 0.0003% to about 1% by weight of the treatment fluid. One skilled in the art, with the benefit of this disclosure, will recognize the appropriate amount of dispersant for inclusion in the treatment fluids of the present invention for a particular application.

Optionally, the treatment fluids of the present invention may comprise surfactants. Suitable examples of surfactants include, but are not limited to, nonylphenol ethoxylates, alcohol ethoxylates, sugar lipids, α-olefinsulfonates, alkylpolyglycosides, alcohol sulfates, salts of ethoxylated alcohol sulfates, alkyl amidopropyl dimethylamine oxides, and alkene amidopropyl dimethylamine oxides. An example of a surfactant that may be suitable comprises an oxyalkylated-sulfonate, and is commercially available from Halliburton Energy Services, Inc. under the trade name "STABILIZER 434C." Another surfactant that may be suitable comprises an alkylpolysaccharide, and is commercially available from Seppic, Inc. of Fairfield, N.J. under the trade designation "SIMUSOL-10." Another surfactant that may be suitable comprises ethoxylated nonylphenols, and is commercially available under the trade name "DUAL SPACER SURFACTANT A" from Halliburton Energy Services, Inc. Where included, the surfactant may be present in an amount in the range from about 0.01% to about 10% by weight of the treatment fluid. In other embodiments of the present invention, the surfactant may be present in an amount in the range from about 0.01% to about 6% by weight of the treatment fluid. One skilled in the art, with the benefit of this disclosure will recognize the appropriate amount of surfactant for a particular application.

Optionally, the treatment fluids of the present invention may comprise weighting agents. Generally, any weighting agent may be used with the treatment fluids of the present invention. Suitable weighting materials may include barium sulfate, hematite, manganese tetraoxide, ilmenite, calcium carbonate, and the like. An example of a suitable hematite is commercially available under the trade name HiDense® No. 4" from Halliburton Energy Services, Inc. Where included, the weighting agent may be present in the treatment fluid in an amount sufficient to provide a desired density to the treatment fluid. In certain embodiments, the weighting agent may be present in the treatment fluids of the present invention in the range from about 0.01% to about 85% by weight. In other embodiments, the weighting agent may be present in the treatment fluids of the present invention in the range from about 15% to about 70% by weight. One of ordinary skill in the art, with the benefit of this disclosure, will recognize the appropriate amount of weighting agent to use for a chosen application.

Optionally, other additives may be added to the treatment fluids of the present invention as deemed appropriate by one skilled in the art with the benefit of this disclosure. Examples of such additives include, inter alia, defoamers, curing agents, salts, corrosion inhibitors, scale inhibitors, and formation conditioning agents. One of ordinary skill in the art with the benefit of this disclosure will recognize the appropriate type of additive for a particular application.

Certain embodiments of the fluids of the present invention may demonstrate improved "300/3" ratios. As referred to herein, the term "300/3" ratio will be understood to mean the value that results from dividing the shear stress that a fluid demonstrates at 300 rpm by the shear stress that the same fluid demonstrates at 3 rpm. When treatment fluids are used as spacer fluids, an ideal "300/3" ratio would closely approximate 1.0, indicating that the rheology of such fluid is flat. Flat rheology will facilitate, inter alia, maintenance of nearly uniform fluid velocities across a subterranean annulus, and also may result in a near-constant shear stress profile. In certain embodiments, flat rheology may reduce the volume of a spacer fluid that is required to effectively clean a subterranean well bore. Certain embodiments of the fluids of the present invention may demonstrate 300/3 ratios in the range of from about 1 to about 9. In some embodiments, the range may be from about 2 to about 5. Certain embodiments of the fluids of the present invention may maintain a nearly flat rheology across a wide temperature range.

The fluids of the present invention may be prepared in a variety of ways. In certain embodiments of the present invention, the well fluids of the present invention may be prepared by first pre-blending the pumicite with certain optional dry additives. Next, the blended dry materials may be mixed with base fluid in the field, either by batch mixing or continuous ("on-the-fly") mixing. In certain embodiments of the present invention wherein the blended dry materials are mixed with base fluid by batch mixing, a weak organic acid and defoamers typically will be premixed into the base fluid. The dry blend then may be added to the base fluid using, e.g., an additive hopper with venturi effects; the mixture of the dry blend and the base fluid also may be agitated, after which the weighting material may be added and agitated. Surfactants may be added to the spacer fluid shortly before it is placed down hole. In certain embodiments of the present invention wherein the blended dry materials are mixed with base fluid by continuous mixing, the blended dry materials typically will be further blended with a weighting material, and the resulting mixture may be metered into, e.g., recirculating cement mixing equipment while the base fluid is metered in separately. The base fluid typically will comprise defoamers pre-blended therein. Shortly before the spacer fluid is placed down hole, surfactants may be added to the spacer fluid. In other embodiments, the fluid may be prepared my mixing all but one or some of the components at a first location (for example at a suitable operations base) and then the remaining components may be added at a second location (such as the well location) before the fluid is pumped into the well bore.

An example of a method of the present invention is a method of displacing a fluid in a well bore, comprising: providing a well bore having a first fluid disposed therein; and placing a second fluid into the well bore to at least partially displace the first fluid therefrom, wherein the second fluid comprises pumicite and a base fluid.

Another example of a method of the present invention is a method of separating fluids in a well bore in a subterranean formation, comprising: providing a well bore having a first fluid disposed therein; placing a spacer fluid in the well bore to separate the first fluid from a second fluid, the spacer fluid comprising a pumicite and a base fluid; and placing a second fluid in the well bore.

An example of a composition of the present invention comprises 60.44% barite by weight, 36.26% water by weight, 3.08% pumicite by weight, and 0.22% $Fe_2$ by weight. Another example of a composition of the present invention comprises 51.51% water by weight, 42.67% barite by weight, 5.65% pumicite by weight, and 0.17% $Fe_2$ by weight. Yet another example of a composition of the present invention comprises 75.93% water by weight, 14.24% barite by weight, 9.74% pumicite by weight, and 0.08% $Fe_2$ by weight.

In certain embodiments, the present disclosure provides settable spacer fluids. In other embodiments, the present disclosure provides methods of forming settable spacer fluids by adding an activating agent to the treatment fluids discussed herein. In other embodiments, the present disclosure provides methods of using settable spacer fluids in subterranean formations.

The settable spacer fluids may generally comprise pumicite, a base fluid, and an activating agent. Optionally, the settable spacer fluids of the present disclosure may comprise additional additives as may be required or beneficial for a particular use. For example, the settable spacer fluids of the present invention may include other additives such as accelerators, viscosifying agents, organic polymers, dispersants, surfactants, weighting agents, vitrified shale, and any combinations thereof.

The pumicite utilized in the settable spacer fluids of the present invention generally comprises any volcanic or similar material full of cavities and very light in weight. In some embodiments of the present invention, the pumicite present in the settable spacer fluids may be an amorphous aluminum silicate, containing less crystalline silica than vitrified shale. In certain embodiments, the pumicite present in the settable spacer fluids may contain less than 1% crystalline silica. In certain embodiments of the present invention, the pumicite present in the settable spacer fluids is sized to pass through a 200 mesh screen (DS-200). In other embodiments, the pumicite is sized to pass through a 20 mesh screen or a 325 mesh screen.

In certain embodiments of the present invention, pumicite may be present in the settable spacer fluids of the present invention in an amount in the range of from about 0.01% to about 90% by weight of the settable spacer fluid. In other embodiments of the present invention, the pumicite is present in the settable spacer fluids of the present invention in an amount in the range of from about 1% to about 80% by weight of the settable spacer fluid. In other embodiments of the present invention, the pumicite is present in the settable spacer fluids of the present invention in an amount in the range of from about 10% to about 60% by weight of the settable spacer fluid. In other embodiments of the present invention, the pumicite is present in the settable spacer fluids of the present invention in an amount in the range of from about 20% to about 40% by weight of the settable spacer fluid. In other embodiments of the present invention, the pumicite is present in the settable spacer fluids of the present invention in an amount in the range of from about 30% to about 35% by weight of the settable spacer fluid. One skilled in the art, with the benefit of this disclosure, will recognize a suitable amount of pumicite for a particular application.

The base fluid utilized in the settable spacer fluids of the present invention may comprise an aqueous-based fluid, an oil-based fluid, a synthetic fluid, or an emulsion. In certain embodiments of the present invention, the base fluid may be an aqueous-based fluid that comprises fresh water, salt water, brine, sea water, or a mixture thereof. In certain embodiments of the present invention, the base fluid may be an aqueous-based fluid that may comprise cesium and/or potassium formate. The base fluid can be from any source provided that it does not contain compounds that may adversely affect other components in the settable spacer fluid. The base fluid may be from a natural or synthetic source. In certain embodiments of the present invention, the base fluid may comprise a synthetic fluid such as, but not limited to, esters, ethers, and olefins. Generally, the base fluid will be present in the settable spacer fluids of the present invention in an amount sufficient to form a pumpable slurry. In certain embodiments, the base fluid will be present in the settable spacer fluids of the present invention in an amount in the range of from about 10% to about 95% by weight of the settable spacer fluid. In other embodiments, the base fluid will be present in the settable spacer fluids of the present invention in an amount in the range of from about 25% to about 85% by weight of the settable spacer fluid. One of ordinary skill in the art, with the benefit of this disclosure, will recognize the appropriate amount of base fluid to use for a chosen application.

In certain embodiments, the activating agent may be any material that allows the settable spacer fluids to set in the well bore. In certain embodiments, the activating agent may be a material that comprises a source of calcium or a source of hydroxide. In certain embodiments, the activating agent may comprise lime, calcium chloride, cement, calcium bromide, sodium hexametaphosphate, sodium silicate, or other calcium sources. In certain embodiments, the activating agent may comprise hydrated lime.

In certain embodiments, the activating agent may be present in the settable spacer fluids of the present invention in an amount sufficient to allow for the settable spacer fluids to set in the well bore. In certain embodiments, the activating agent will be present in the settable spacer fluids of the present invention in an amount in the range of from about 0.01% to about 35% by weight of the settable spacer fluid. In certain embodiments, the activating agent will be present in the settable spacer fluids of the present invention in an amount in the range of from about 5% to about 10% by weight of the settable spacer fluid. In other embodiments, the mass ratio of activating agent to pumicite may be from about to 1:10 to about 1:2. One of ordinary skill in the art, with the benefit of this disclosure, will recognize the appropriate amount of activating agent to use for a chosen application.

Optionally, the settable spacer fluids of the present invention may further comprise a set accelerator. Generally, any set accelerator may be used with the settable spacer fluids of the present invention. One of ordinary skill in the art, with the benefit of this disclosure, will be able to identify a suitable set accelerator for a particular application. Where used, the set accelerator generally will be present in the settable spacer fluid in an amount in the range of from about 0.5% to about 8% by weight of the settable spacer fluid.

Optionally, the settable spacer fluids of the present invention further may comprise a viscosifying agent. The viscosifying agent may be any component suitable for providing a desired degree of solids suspension. The choice of a viscosifying agent depends upon factors such as the desired viscosity and the desired chemical compatibility with other fluids (e.g., drilling fluids, cement compositions, and the like). In certain embodiments of the present invention, the viscosifying agent may be easily flocculated and filtered out of the settable spacer fluids of the present invention. Suitable viscosifying agents may include, but are not limited to, colloidal agents (e.g., clays, polymers, guar gum), emulsion forming agents, diatomaceous earth, starches, biopolymers, synthetic polymers, or mixtures thereof. Suitable viscosifying agents often are hydratable polymers that have one or more functional groups. These functional groups include, but are not limited to, hydroxyl groups, carboxyl groups, carboxylic acids, derivatives of carboxylic acids, sulfate groups, sulfonate groups, phosphate groups, phosphonate groups, and amino groups. In certain embodiments of the present invention, viscosifying agents may be used that comprise hydroxyl groups and/or amino groups. In certain embodiments of the present invention, the viscosifying agents may be biopolymers, and derivatives thereof, that have one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethyl hydroxypropyl guar, and cellulose derivatives, such as hydroxyethyl cellulose, welan gums, and xanthan gums. Additionally, synthetic polymers that contain the above-mentioned functional groups may be used. Examples of such synthetic polymers include, but are not limited to, poly(acrylate), poly(methacrylate), poly(ethylene imine), poly(acrylamide), poly(vinyl alcohol), and poly(vinylpyrrolidone). Other suitable viscosifying agents include chitosans, starches and gelatins. Suitable clays include kaolinites, montmorillonite, bentonite, hydrous micas, attapulgite, sepiolite, and the like, as well as synthetic clays, such as laponite. An example of a suitable viscosifying agent is a hydroxyethyl cellulose that is commercially available under the trade name "WG-17" from Halliburton Energy Services, Inc., of Duncan, Okla. Another example of a suitable viscosifying agent is a welan gum that is commercially available under the trade name "BIOZAN" from Kelco Oilfield Services, Inc. Where included, the viscosifying agent may be present in the settable spacer fluids of the present invention in an amount sufficient to provide a desired degree of solids suspension. In certain embodiments, the viscosifying agent may be present in an amount in the range from about 0.01% to about 35% by weight of the settable spacer fluid. In other embodiments, the viscosifying agent may be present in an amount in the range from about 0.5% to about 2% by weight of the settable spacer fluid. In certain embodiments of the present invention wherein the treatment fluids will be exposed to elevated pH conditions (e.g., when the treatment fluids will be contacted with cement compositions), viscosifying agents such as welan gum, cellulose (and cellulose derivatives), and xanthan gum may be particularly suitable. One of ordinary skill in the art, with the benefit of this disclosure, will be able to identify a suitable viscosifying agent, as well as the appropriate amount to include, for a particular application.

Optionally, the settable spacer fluids of the present invention further may comprise a fluid loss control additive. Any fluid loss control additive suitable for use in a subterranean application may be suitable for use in the compositions and methods of the present invention. In certain embodiments, the fluid loss control additive may comprise organic polymers, starches, or fine silica. An example of a fine silica that may be suitable is commercially available from Halliburton Energy Services, Inc. under the trade name "WAC-9." An example of a starch that may be suitable is commercially available from Halliburton Energy Services, Inc. under the trade name "N-Dril HT Plus." In certain embodiments where the settable spacer fluids of the present invention comprise a fluid loss control additive, the fluid loss control additive may be present in the settable spacer fluids of the present invention in an amount in the range from about 0.01% to about 6% by weight of active ingredient. In other embodiments, the fluid loss control additive may be present in the settable spacer fluids of the present invention in an amount in the range from about 0.05% to about 2% by weight active ingredient. One skilled in the art, with the benefit of this disclosure, will recognize the appropriate amount of a fluid loss control additive to use for a particular application.

Optionally, the settable spacer fluids of the present invention may comprise a dispersant. Suitable examples of dispersants include, but are not limited to, sulfonated styrene maleic anhydride copolymer, sulfonated vinyl toluene maleic anhydride copolymer, sodium naphthalene sulfonate condensed with formaldehyde, sulfonated acetone condensed with formaldehyde, lignosulfonates (e.g., modified sodium lignosulfonate), allyloxybenzene sulfonate, allyl sulfonate and non-ionic monomers, and interpolymers of acrylic acid. An example of a dispersant that may be suitable is commercially available from National Starch & Chemical Company of Newark, N.J. under the trade name "Alcosperse 602 ND," and is a mixture of 6 parts sulfonated styrene maleic anhydride copolymer to 3.75 parts interpolymer of acrylic acid. Another example of a dispersant that may be suitable is a modified sodium lignosulfonate that is commercially available from Halliburton Energy Services, Inc., of Duncan, Okla., under the trade name "CFR-3." Where included, the dispersant may be present in an amount in the range from about 0.0001% to about 4% by weight of active ingredient. In other embodiments, the dispersant may be present in an amount in the range from about 0.0003% to about 1% by weight of active ingredient. One skilled in the art, with the benefit of this disclosure, will recognize the appropriate amount of dispersant for inclusion in the treatment fluids of the present invention for a particular application.

Optionally, the settable spacer fluids of the present invention may comprise surfactants. Suitable examples of surfactants include, but are not limited to, nonylphenol ethoxylates, alcohol ethoxylates, sugar lipids, α-olefinsulfonates, alkylpolyglycosides, alcohol sulfates, salts of ethoxylated alcohol sulfates, alkyl amidopropyl dimethylamine oxides, and alkene amidopropyl dimethylamine oxides. An example of a surfactant that may be suitable comprises an oxyalkylatedsulfonate, and is commercially available from Halliburton Energy Services, Inc. under the trade name "SEM-8." Another surfactant that may be suitable comprises an alkylpolysaccharide, and is commercially available from Seppic, Inc. of Fairfield, N.J. under the trade designation "SIMU-SOL-10." Another surfactant that may be suitable comprises ethoxylated nonylphenols, and is commercially available under the trade name "DUAL SPACER SURFACTANT A" from Halliburton Energy Services, Inc. Where included, the surfactant may be present in an amount in the range from about 0.01% to about 10% by weight of the settable spacer fluid. In other embodiments of the present invention, the surfactant may be present in an amount in the range from about 0.01% to about 6% by weight of the settable spacer fluid. One skilled in the art, with the benefit of this disclosure will recognize the appropriate amount of surfactant for a particular application.

Optionally, the settable spacer fluids of the present invention may comprise weighting agents. Generally, any weighting agent may be used with the settable spacer fluids of the present invention. Suitable weighting materials may include barite, hematite, manganese tetraoxide, ilmenite, calcium carbonate, crushed rock, silica, cement kiln dust, silica, and the like. An example of a suitable hematite is commercially available under the trade name "Hi-Dense® No. 4" from Halliburton Energy Services, Inc. Where included, the weighting agent may be present in the settable spacer fluid in an amount sufficient to provide a desired density to the settable spacer fluid. In certain embodiments, the weighting agent may be present in the settable spacer fluids of the present invention in the range from about 0.01% to about 85% by weight. In other embodiments, the weighting agent may be present in the settable spacer fluids of the present invention in the range from about 15% to about 70% by weight. One of ordinary skill in the art, with the benefit of this disclosure, will recognize the appropriate amount of weighting agent to use for a chosen application.

Optionally, other additives may be added to the settable spacer fluids of the present invention as deemed appropriate by one skilled in the art with the benefit of this disclosure. Examples of such additives include, inter alia, strength restoration additives, lost circulation materials, weight reducing additives, friction reducing materials, defoamers, curing agents, salts, corrosion inhibitors, scale inhibitors, and formation conditioning agents. One of ordinary skill in the art with the benefit of this disclosure will recognize the appropriate type of additive for a particular application.

Certain embodiments of the settable spacer fluids of the present invention may demonstrate improved "300/3" ratios. In certain embodiments, the "300/3" ratio for the settable spacer fluids discussed herein may be in the range from about 1 to about 50. In some embodiments, the range may be from about 5 to about 20. In other embodiments, the range may be from about 10 to about 15.

The settable spacer fluids of the present invention may be prepared in a variety of ways. In certain embodiments of the present invention, the settable spacer fluids of the present invention may be prepared by first pre-blending the pumicite with certain optional dry additives. Next, the blended dry materials may be mixed with base fluid in the field, either by batch mixing or continuous ("on-the-fly") mixing. In certain embodiments of the present invention wherein the blended dry materials are mixed with base fluid by batch mixing, a weak organic acid and defoamers typically will be premixed into the base fluid. The dry blend then may be added to the base fluid using, e.g., an additive hopper with venturi effects; the mixture of the dry blend and the base fluid also may be agitated, after which the weighting material may be added and agitated. Surfactants may be added to the spacer fluid shortly before it is placed down hole. In certain embodiments of the present invention wherein the blended dry materials are mixed with base fluid by continuous mixing, the blended dry materials typically will be further blended with a weighting material, and the resulting mixture may be metered into, e.g., recirculating cement mixing equipment while the base fluid is metered in separately. The base fluid typically will comprise defoamers pre-blended therein. Shortly before the settable spacer fluid is placed down hole, surfactants may be added to the spacer fluid. In other embodiments, the fluid may be prepared my mixing all but one or some of the components at a first location (for example at a suitable operations base) and then the remaining components (such as the activating agent) may be added at a second location (such as the well location) before the fluid is pumped into the well bore.

In another embodiment, a settable spacer fluid may be prepared by adding the activating agent and/or the pumicite to an existing well bore fluid. In certain embodiments, the activating agent and/or the pumicite may be added to the existing well bore fluid while it is present in the well bore or after it has been removed from the well bore. For example, in certain embodiments a settable spacer fluid may be prepared by adding an activating agent and/or pumicite to a drilling fluid present in the well bore after a drilling operation has been performed. In other embodiments, a settable spacer fluid may be prepared by adding an activating agent and/or pumicite to a drilling fluid that has been removed from well bore after a drilling operation has been performed. In certain embodiments, the drilling fluid may comprise pumicite.

An example of a method of the present invention is a method of displacing a fluid in a well bore, comprising: providing a well bore having a first fluid disposed therein; placing a second fluid into the well bore to at least partially displace the first fluid therefrom, wherein the second fluid comprises pumicite, a base fluid, and an activating agent; and allowing the second fluid to set in the well bore.

Another example of a method of the present invention is a method of separating fluids in a well bore in a subterranean formation, comprising: providing a well bore having a first fluid disposed therein; placing a second fluid into the well bore to displace at least a portion of the first fluid therefrom, wherein the second fluid comprises pumicite, an activating agent, and a base fluid; and allowing the second fluid to a least partially set in the well bore.

Another example of a method of the present invention is a method of separating fluids in a well bore in a subterranean formation, comprising: providing a well bore having a first fluid disposed therein; placing a second fluid into the well bore to displace at least a portion of the first fluid therefrom, wherein the second fluid comprises pumicite, an activating agent, and a base fluid; placing a cement composition into the well bore to displace at least a first portion of the second fluid therefrom, wherein at least a second portion of the first fluid remains therein; allowing the cement composition to at least partially set in the well bore; and allowing the second portion of second fluid to at least partially set in the well bore.

To facilitate a better understanding of the present invention, the following examples of preferred embodiments are given. In no way should the following examples be read to limit, or to define, the scope of the invention.

EXAMPLES

Example 1

Rheological testing was performed on a variety of sample compositions that were prepared as follows. First, all dry components (e.g., pumicite, or vitrified shale, or zeolite, or fumed silica, plus dry additives such as, for example, hydroxyethylcellulose, BIOZAN, citric acid, barite, and sodium lignosulfonate) were weighed into a glass container having a clean lid, and thoroughly agitated by hand until well blended. Tap water then was weighed into a Waring blender jar, and the blender turned on at 3,000-4,000 rpm. While the blender continued to turn, the blended dry components were added along with 2 drops of a standard, glycol-based defoamer. The blender speed then was maintained at 3,000-4,000 rpm for about 5 minutes.

Rheological values then were determined using a Chan model 35 viscometer. Dial readings were recorded at speeds of 3, 6, 30, 60, 100, 200, and 300 RPM with a B1 bob, an R1 rotor, and a 1.0 spring.

Sample Composition No. 1 comprised a 16 pound per gallon slurry of shale, 29.6 grams Tuned Spacer III ("TS III") blend, 580.9 grams barite, 348.5 grams water, and 2.13 grams Fe2.

Sample Composition No. 2 replaced the shale with DS-200 pumicite, and comprised a 16 pound per gallon slurry of DS-200 pumicite, 29.6 grams TS III blend, 580.9 grams barite, 348.5 grams water, and 2.13 grams Fe2.

Sample Composition No. 3 comprised a 13 pound per gallon slurry of shale, 44.1 grams TS III blend, 333.2 grams barite, 402.2 grams water, and 1.32 grams Fe2.

Sample Composition No. 4 replaced the shale with DS-200 pumicite, and comprised a 13 pound per gallon slurry of DS-200 pumicite, 44.1 grams TS III blend, 333.2 grams barite, 402.2 grams water, and 1.32 grams Fe2.

Sample Composition No. 5 comprised a 10 pound per gallon slurry of shale, 58.5 grams TS III blend, 85.5 grams barite, 455.9 grams water, and 0.5 grams Fe2.

Sample Composition No. 6 replaced the shale with DS-200 pumicite, and comprised a 10 pound per gallon slurry of DS-200 pumicite, 58.5 grams TS III blend, 85.5 grams barite, 455.9 grams water, and 0.5 grams Fe2.

The results of the testing are set forth in Table 1 below. The abbreviation "PV" stands for plastic viscosity, while the abbreviation "YP" refers to yield point.

Example 2

A series of various tests were performed on a variety of sample compositions that were prepared as follows. First, all dry components (e.g., pumicite and lime, plus dry additives) were weighed into a glass container having a clean lid, and thoroughly agitated by hand until well blended. The liquid additives were measured out in suitable syringes. Tap water then was weighed into a Waring blender jar, and the blender turned on at 3,000-4,000 rpm. While the blender continued to turn, the liquid and blended dry components were added along with 2 drops of a standard, glycol-based defoamer. The blender speed then was maintained at 3,000-4,000 rpm for about 5 minutes. This mixing sequence was repeated for the number of times it took to allow for the testing that was necessary.

Rheological values then were determined using a Chan model 35 viscometer. Dial readings were recorded at speeds of 3, 6, 30, 60, 100, 200, and 300 RPM with a B1 bob, an R1 rotor, and a 1.0 spring.

A sample composition comprised 600 kg/m$^3$ of pumicite, 504.6 l/m$^3$ water, 367.95 kg/m$^3$ barite, 50 l/m$^3$ of fluid loss control agent, 100 kg/m$^3$ of KCl, 167 kg/m$^3$ of lime, 3 l/m$^3$ of defoamer, and 24 l/m$^3$ of surfactant. The measured thickening time for this composition was 48 hours and 47 minutes at 118° F. The measured thickening time for the composition was then determined to be 20 hours and 2 minutes at 200° F. The composition was tested for strength development using an ultrasonic cement analyzer. A value of 523 psi at 48 hours was measured. After a 7 day cure, some mechanical properties were measured by using a destructive test method. The composition had a tensile strength of 208 psi, a Young's Modulus of 413,000 psi, a Poissons Ratio of 0.179, and a compressive strength of 1,091 psi.

The results of the rheology testing for the sample composition at 68° F. and 118° F. in units of centipoise are set forth in Table 2 below.

TABLE 1

| Sample | Temp. (F.) | Cement Contamination | Viscometer RPM | | | | | | | 300/3 ratio | PV | YP |
|---|---|---|---|---|---|---|---|---|---|---|---|---|
| | | | 300 | 200 | 100 | 60 | 30 | 6 | 3 | | | |
| 1 | 80 | none | 60 | 50 | 38 | 32.5 | 27 | 20 | 18 | 3.33 | 33 | 27 |
| 2 | 80 | none | 68 | 57 | 43 | 36 | 30 | 23 | 21.5 | 3.16 | 37.5 | 30.5 |
| 3 | 80 | none | 57 | 49 | 39 | 34 | 29 | 21 | 20 | 2.85 | 27 | 30 |
| 4 | 80 | none | 55 | 44 | 35 | 38 | 23 | 16 | 14 | 3.93 | 30 | 25 |
| 5 | 80 | none | 39 | 33 | 26 | 23 | 19 | 13 | 12.5 | 3.12 | 19.5 | 19.5 |
| 6 | 80 | none | 38 | 33 | 27 | 24 | 20.5 | 15 | 13.5 | 2.81 | 16.5 | 21.5 |
| 1 | 180 | none | 51 | 41.5 | 31 | 26 | 22 | 15 | 14 | 3.64 | 30 | 21 |
| 2 | 180 | none | 45 | 38 | 29 | 24.5 | 20.5 | 15 | 14.5 | 3.10 | 24 | 21 |
| 3 | 180 | none | 50 | 42.5 | 34 | 30.5 | 26 | 20.5 | 19 | 2.63 | 24 | 26 |
| 4 | 180 | none | 40 | 34 | 27 | 23 | 19 | 14 | 13 | 3.08 | 18.5 | 21.5 |
| 5 | 180 | none | 38 | 32 | 27 | 24 | 20 | 17 | 15 | 2.53 | 16.5 | 21.5 |
| 6 | 180 | none | 37 | 32 | 26 | 23.5 | 20.5 | 15.5 | 14 | 2.64 | 16.5 | 20.5 |
| 1 | 80 | 0.50% | 73 | 62 | 49 | 42 | 36 | 27 | 26 | 2.81 | 36 | 37 |
| 2 | 80 | 0.50% | 77 | 66 | 51 | 46 | 38 | 30 | 28 | 2.75 | 39 | 38 |
| 4 | 80 | 0.50% | 52 | 45 | 37 | 33.5 | 29 | 21 | 20 | 2.6 | 22.5 | 29.5 |
| 1 | 180 | 0.50% | 100 | 82 | 66 | 58 | 52 | 45 | 44 | 2.27 | 51 | 49 |
| 2 | 180 | 0.50% | 110 | 92 | 74 | 66 | 61 | 50 | 50 | 2.20 | 54 | 56 |
| 4 | 180 | 0.50% | 60 | 52 | 42 | 36 | 30.5 | 22 | 20 | 3.00 | 27 | 33 |
| 1 | 80 | 1% | 72 | 60 | 46 | 39 | 32 | 24 | 22 | 3.27 | 39 | 33 |
| 1 | 180 | 1% | 77 | 63 | 48 | 41 | 35 | 28 | 26 | 2.96 | 43.5 | 33.5 |
| 1 | 80 | 2% | 67 | 56 | 41 | 34 | 27 | 19 | 17 | 3.94 | 39 | 28 |
| 1 | 180 | 2% | 85 | 69 | 51 | 43 | 36 | 27 | 25.5 | 3.33 | 49.5 | 30.5 |
| 1 | 80 | 3% | 68 | 56 | 41 | 34 | 27 | 18 | 16 | 4.25 | 40.5 | 27.5 |
| 2 | 80 | 3% | 60 | 50 | 37 | 30 | 24 | 15.5 | 13 | 4.62 | 34.5 | 25.5 |
| 1 | 180 | 3% | 80 | 64 | 47 | 38.5 | 21 | 22 | 21 | 3.81 | 49.5 | 30.5 |
| 2 | 180 | 3% | 76 | 62 | 45 | 36 | 29 | 18 | 17 | 4.47 | 46.5 | 29.5 |
| 1 | 80 | 5% | 65 | 53 | 39 | 31.5 | 26 | 17 | 15 | 4.33 | 39 | 26 |
| 1 | 180 | 5% | 78 | 63 | 46 | 37.5 | 31 | 21 | 19 | 4.10 | 48 | 30 |

TABLE 2

| RPM | Viscosity at 68° F. (cp) | Viscosity at 118° F. (cp) |
|---|---|---|
| 600 | — | — |
| 300 | 141 | 92 |
| 200 | 104 | 64.5 |
| 100 | 60 | 38.5 |
| 60 | 43 | 28 |
| 30 | 27 | 21 |
| 6 | 14 | 10.5 |
| 3 | 4 | 6.5 |

The above Examples demonstrates, inter alia, that the improved treatment fluids of the present invention comprising pumicite and a base fluid may be suitable for use in treating subterranean formations. One having ordinary skill in the art will appreciate that vitrified shale may be used in conjunction with the pumicite disclosed herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of using a settable fluid in a well bore, comprising:
   providing a well bore having a first fluid disposed therein;
   placing a second fluid into the well bore to displace at least a portion of the first fluid therefrom, wherein the second fluid comprises pumicite, an activating agent, and a base fluid;
   placing a third fluid comprising a cement composition into the well bore to displace at least a first portion of the second fluid therefrom, wherein the third fluid is incompatible with the first fluid;
   allowing the third fluid comprising the cement composition to at least partially set in the well bore; and
   allowing a portion of the second fluid to at least partially set in the well bore.

2. The method of claim 1, wherein the activating agent comprises at least one activating agent selected from the group consisting of: lime; calcium chloride; calcium bromide; sodium hexametaphosphate; sodium silicate; sodium sulfate; and a combination thereof.

3. The method of claim 1, wherein the second fluid further comprises a set accelerator.

4. The method of claim 1, wherein the first fluid comprises a drilling fluid.

5. The method of claim 1, wherein the pumicite is present in the second fluid in an amount from about 0.01% to about 90% by weight of the second fluid.

6. The method of claim 1, wherein the activating agent is present in the second fluid in an amount from about 0.01% to about 35% by weight of the second fluid.

7. The method of claim 1, wherein the second fluid has a 300/3 ratio of from about 5 to about 50.

8. The method of claim 1, wherein the second fluid comprises at least one of base fluid selected from the group consisting of: an aqueous-based fluid, an emulsion, a synthetic fluid, an oil based fluid, and a combination thereof.

* * * * *